(12) United States Patent
Murata et al.

(10) Patent No.: US 7,094,520 B2
(45) Date of Patent: Aug. 22, 2006

(54) DIE FOR MOLDING OPTICAL PANEL, PROCESS FOR PRODUCTION THEREOF, AND USE THEREOF

(75) Inventors: Kenzo Murata, Toyonaka (JP); Yoji Oki, Yokohama (JP)

(73) Assignees: Sumitomo Chemical Company, Limited, Osaka (JP); Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 10/389,939

(22) Filed: Mar. 18, 2003

(65) Prior Publication Data

US 2003/0173690 A1 Sep. 18, 2003

(30) Foreign Application Priority Data

Mar. 18, 2002 (JP) ............................. 2002-073834

(51) Int. Cl.
*G03C 5/00* (2006.01)
*G03F 7/00* (2006.01)
(52) U.S. Cl. ................ 430/322; 430/275.1; 430/283.1; 430/321; 430/325; 430/327
(58) Field of Classification Search ................ 430/17, 430/18, 320, 283.1, 275.1, 396, 322, 325, 430/327, 321; 264/1.34, 1.36, 2.5
See application file for complete search history.

(56) References Cited

U.S. PATENT DOCUMENTS

| | | | | |
|---|---|---|---|---|
| 4,079,159 A | * | 3/1978 | Sano et al. ................ 428/172 |
| 5,376,483 A | * | 12/1994 | Rolfson ......................... 430/5 |
| 5,521,034 A | * | 5/1996 | Hotta ........................... 430/17 |
| 2001/0048594 A1 | | 12/2001 | Murase et al. | |

FOREIGN PATENT DOCUMENTS

| | | | |
|---|---|---|---|
| JP | 2001-337229 | * | 12/2001 |
| JP | 2002-127146 A | | 5/2002 |
| JP | 2003-067985 A | | 3/2003 |

* cited by examiner

*Primary Examiner*—Thorl Chea
(74) *Attorney, Agent, or Firm*—Sughrue Mion, PLLC

(57) ABSTRACT

An object of the present invention is to provide a die suitable for producing an optical panel having an optical pattern (e.g. dots or lines) integrally formed on at least one side of the optical panel, which is, for example, an edge light panel or a light diffusion panel, which is used in a backlight or front light for a liquid crystal display, and various illuminators such as electric signs. According to the present invention, there are provided an optical-panel molding die for integrally forming an optical pattern on at least one side of an optical panel, which comprises a metal substrate and a molding pattern corresponding to said optical pattern and formed of a photosensitive heat-resistant resin on one side of the metal substrate, the whole of the surface having the molding pattern of the metal substrate being covered with a layer of said heat-resistant resin; a process for producing the die; and a process for producing an optical panel by using the die.

5 Claims, 5 Drawing Sheets

COATING-
PRE-BAKING
STEP

LIGHT
EXPOSURE
STEP

DEVELOPMENT
RINSING
STEP

BAKING
STEP

FIRST COATING·INACTIVATION STEP

SECOND COATING·PRE-BAKING STEP

LIGHT EXPOSURE STEP

DEVELOPMENT·RINSING STEP

BAKING STEP

DIE FOR MOLDING OPTICAL PANEL, PROCESS FOR PRODUCTION THEREOF, AND USE THEREOF

BACKGROUND OF THE INVENTION

The present invention relates to a die used for producing an optical panel having an optical pattern (e.g. dots or lines) integrally formed on at least one side of the optical panel, which is, for example, an edge light panel or a light-diffusing panel, which is used in a backlight or front light for a liquid crystal display, and various illuminators such as electric signs; a process for producing the die; and a process for producing an optical panel by using the die.

Such an optical panel having an optical pattern formed on at least one side thereof is generally produced by injection molding of a transparent thermoplastic resin. For giving such an optical pattern integrally, there have been known, for example, a method using a mold having concavities and convexities corresponding to the optical pattern of a product which are formed on the predetermined surface of the cavity by machining (e.g. cutting or blasting), electrical discharge machining, etching or the like, and the method proposed in JP-A-9-222514 in which to the inner surface of the mold of an injection molding machine is attached a nickel thin die called stamper which has concavities and convexities corresponding to the optical pattern of a product and formed on the surface of the die, and is obtained by conducting nickel plating on an uneven surface formed by the use of a photoresist and then peeling the photoresist layer.

However, in the case of the mold subjected to machining (e.g. cutting or blasting), electrical discharge machining, etching or the like, the minimum size of the concavities and convexities formed is as large as at least hundreds micrometers. Therefore, the mold is disadvantageous in that when light is introduced into an optical panel injection-molded by the use of the mold, the contrast between light and darkness is too high owing to the pattern, so that it is difficult to obtain uniform light for illumination. On the other hand, the stamper made of nickel involves, for example, the following problems: a very long process is necessary for producing such a stamper; the unit cost of the stamper is high because its production entails high cost of material and running cost and requires a long time; and moreover the production is difficult because individual steps in the production are difficult, so that each of them requires experience and know-how.

The present inventors has found a technique for forming a molding pattern of a photosensitive heat-resistant resin directly on the surface of a metal substrate by a photoresist method using the photosensitive heat-resistant resin and has proposed the technique in JP-A-2001-337229. When this method is adopted, a die having a very precise optical pattern formed thereon can be obtained at a low cost in a short time. However, experiments after the proposal elucidated the following: the release properties in molding by the use of the die are not always good, so that it is necessary, for example, to increase cooling time in a mold a little, and the unsatisfactory release properties tends to affect the durability.

SUMMARY OF THE INVENTION

The present inventors further investigated in order to solve such problems, and consequently found that when the whole of the surface of the metal substrate of a die which has a molding pattern made of a photosensitive heat-resistant resin and corresponding to an optical pattern is covered with said photosensitive heat-resistant resin, the release properties of a molded optical panel from the die is improved; and that when the surface of the metal substrate as a starting material for the die is previously roughened, the release properties and the durability of the die are further improved, whereby the present invention has been accomplished.

Therefore, an object of the present invention is to provide a die obtained by improving the molding die disclosed in JP-A-2001-337229, namely, to provide a die more suitable for producing an optical panel having an optical pattern (e.g. dots or lines) integrally formed on at least one side of surfaces of the optical panel, which is, for example, an edge light panel or a light diffusion panel, which is used in a backlight or front light for a liquid crystal display, and various illuminators such as electric signs; a process for producing the die; and a process for producing an optical panel by using the die.

According to the present invention, there is provided an optical-panel molding die for integrally forming an optical pattern on at least one side of surfaces of an optical panel, the die comprising a metal substrate and a molding pattern corresponding to said optical pattern and formed of a photosensitive heat-resistant resin on one side of surfaces of the metal substrate, wherein the whole of the surface having the molding pattern of the metal substrate is covered with a layer of said heat-resistant resin. In this molding die, it is advantageous to roughen previously the surface of the metal substrate which is to be covered with said heat-resistant resin.

In addition, according to the present invention, there is also provided a process for producing the above-mentioned optical-panel molding die which comprises the steps of forming a layer of a photosensitive heat-resistant resin on the surface of a metal substrate, exposing the layer of the photosensitive heat-resistant resin to light through a mask having a pattern corresponding to the optical pattern of the optical panel, and developing the layer to form a molding pattern corresponding to the pattern of the mask on the layer of the photosensitive heat-resistant resin, wherein the photosensitive heat-resistant resin is left all over the one side of surfaces of the metal substrate also after the development.

Specifically, it is possible to adopt a method in which the development is terminated before the complete dissolution of portions to be developed of the photosensitive heat-resistant resin, whereby the photosensitive heat-resistant resin is left also on areas of the metal substrate which correspond to the developed portions of the resin. It is also possible to adopt a method in which two layers of the photosensitive heat-resistant resin are formed on the surface of the metal substrate and the first layer is deprived of its photosensitivity after its formation, whereby the first layer having no photosensitivity is left on the metal substrate.

Furthermore, according to the present invention, there is provided a process for producing an optical panel having an optical pattern integrally formed on at least one side of surfaces of the optical panel, the process comprising the steps of setting, on at least one of the two surfaces of a mold, a molding die comprising a metal substrate and a molding pattern corresponding to the optical pattern of the optical panel and formed of a photosensitive heat-resistant resin on one side of surfaces of the metal substrate, the whole of the surface having the molding pattern of the metal substrate being covered with a layer of said heat-resistant resin; and injecting a transparent molten resin into a mold cavity comprising the molding die as at least one of its surfaces, to mold the resin.

DESCRIPTION OF REFERENCE NUMERALS

1—backlight,
2—optical panel (light-guiding plate),
2a—back surface of light-guiding plate,
2b—front surface of light-guiding plate,
3—pattern element,
4—optical pattern on panel,
5—reflective sheet,
6—light-diffusing sheet,
7—light source,
9—liquid crystal cell,
10—molding die,
11—metal substrate,
11a—metal substrate surface on which a photosensitive heat-resistant resin layer is to be formed,
12, 13—patterned heat-resistant resin layer,
12a—photosensitive heat-resistant resin layer after coating,
12c—concavities-and-convexities pattern,
13a—photosensitive heat-resistant resin layer after first coating,
13b—photosensitive heat-resistant resin layer after second coating,
13c—concavities-and-convexities pattern,
15—molding pattern,
19—mask.

DETAILED DESCRIPTION OF THE INVENTION

The present invention is explained below in further detail with reference to the drawings by taking an example case where the present invention can be applied to the production of a light-guiding plate that is an edge light panel used in a backlight for a liquid crystal display.

Figure 1:
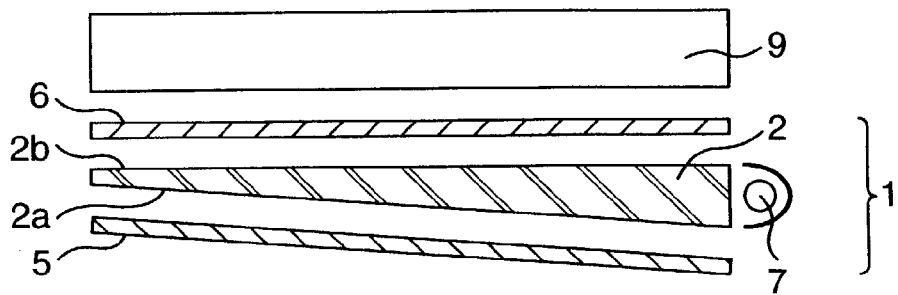
FIG. 1 is a schematic vertical cross-sectional view showing the location of a light-guiding plate in a liquid crystal display.

FIG. 1 is a schematic vertical cross-sectional view schematically showing an example of the location of a light-guiding plate in a liquid crystal display. A backlight 1 is located behind a liquid crystal cell 9 and is composed of a light-guiding plate 2, a reflective sheet 5 located on the back surface side of the light-guiding plate 2, a light-diffusing sheet 6 located on the front surface side of the light-guiding plate 2, and a light source 7 located beside the edge of the light-guiding plate 2. Light from the light source 7 is introduced into the light-guiding plate 2, and it is reflected with the reflective sheet 5 located on the back surface side of the light-guiding plate 2 while being transmitted in the light-guiding plate 2, to come out of the light-guiding plate 2 on the front surface side of the light-guiding plate 2. This light is uniformly emitted all over the front surface of the backlight 1 owing to the presence of the light-diffusing sheet 6, to be used for illumination for the liquid crystal cell 9. FIG. 1 shows the case where the light-guiding plate 2 has a wedge shape of section and the light source 7 is located beside the edge on the thick side of the light-guiding plate 2, though in another case, the light-guiding plate 2 is composed of a flat plate and a light source is located beside each of the two edges facing each other of the light-guiding plate 2.

In the light-guiding plate 2, there is used a thermoplastic transparent synthetic resin having a high light transmittance, such as a methacrylate resin, polycarbonate resin, amorphous cyclic polyolefin resin, methyl methacrylate/styrene copolymer (MS) resin, polystyrene resin or the like. An optical pattern such as dots or lines is often formed on the back surface 2a of the light-guiding plate 2 so that light may be uniformly reflected toward the front surface. On the other hand, an optical pattern such as dots or lines is similarly formed on the front surface 2b of the light-guiding plate 2 in some cases so that light may be efficiently emitted toward the liquid crystal cell 9.

Figure 2:
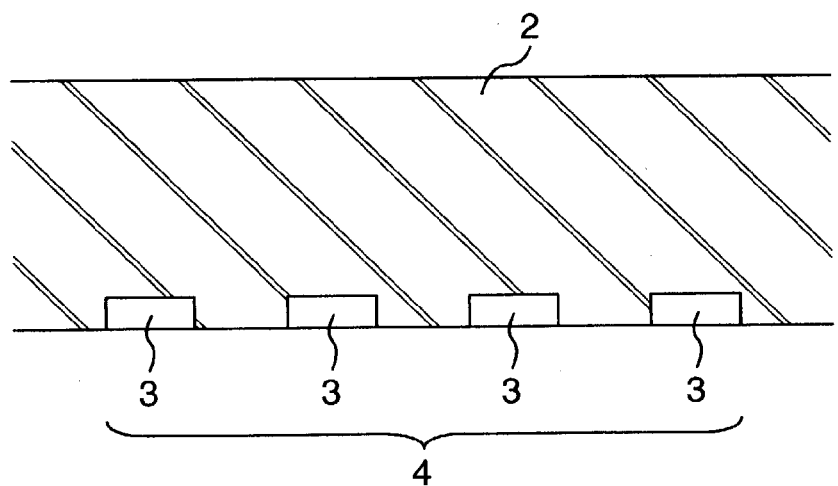
FIG. 2 is a schematic vertical cross-sectional view showing a model of pattern formed on an optical panel.

The present invention relates to a molding die suitably used for producing an optical panel having an optical pattern integrally formed on at least one side of surfaces of the optical panel, such as the light-guiding plate 2, a process for producing the molding die, and a process for forming an optical pattern by the use of the die. FIG. 2 as a schematic vertical cross-sectional view shows the case where an optical pattern is formed on one side of surfaces of an optical panel. In this case, the optical pattern 4 is formed by forming pattern elements 3 as concavities on one side of surfaces of the optical panel 2.

Figure 3:
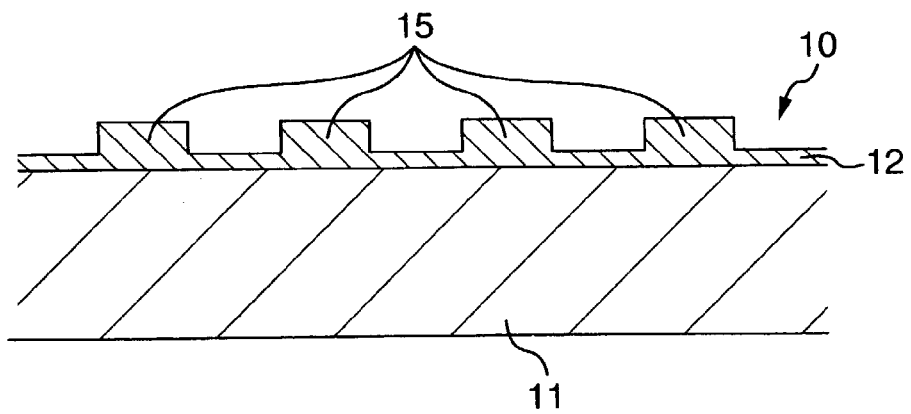
FIG. 3 is a schematic vertical cross-sectional view showing a model of die for molding the optical panel shown in FIG. 2.

For molding an optical panel having the pattern shown in FIG. 2 and integrally formed thereon, a die 10 having a molding pattern 15 formed as a raised pattern on the surface of the die is used, which is shown in FIG. 3 as a schematic vertical cross-sectional view. In the present invention, the die 10 comprises a metal substrate 11 and the aforesaid molding pattern 15 formed of a photosensitive heat-resistant resin on one side of surfaces of the metal substrate 11, the whole of the surface having the molding pattern 15 of the metal substrate 11 being covered with a layer 12 of the aforesaid heat-resistant resin.

Figure 4:
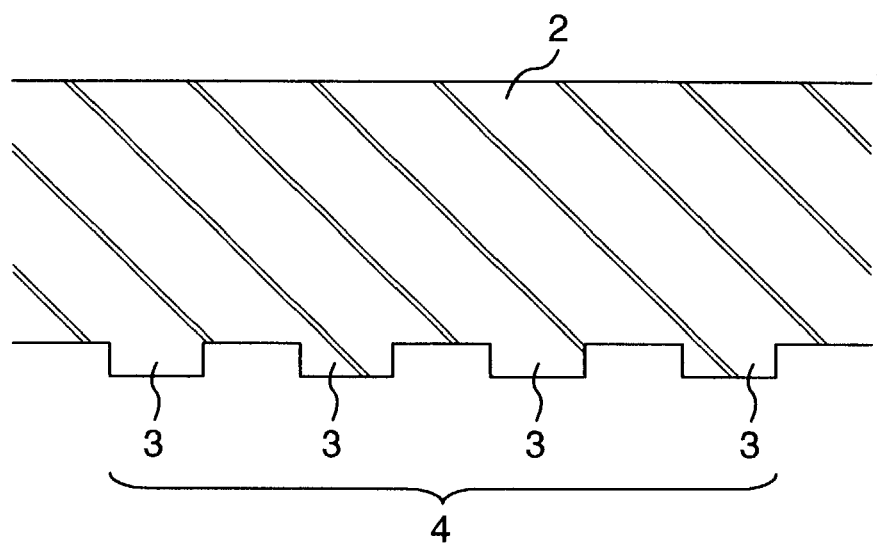
FIG. 4 is a schematic vertical cross-sectional view showing another model of pattern formed on an optical panel.
Figure 5:
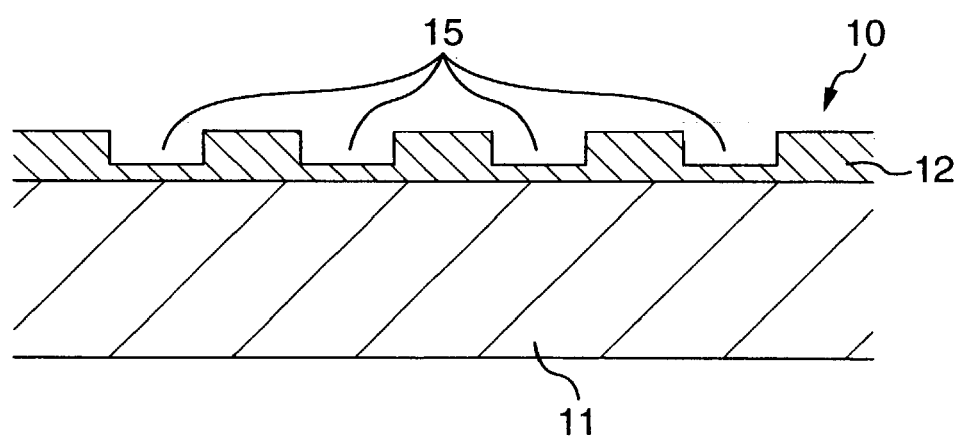
FIG. 5 is a schematic vertical cross-sectional view showing a model of die for molding the optical panel shown in FIG. 4.

FIG. 2 and FIG. 3 show the case where each of the elements 3 of the pattern 4 formed on the surface of the optical panel 2 is a concavity and hence the molding pattern 15 formed on the surface of the die 10 for molding the optical panel 2 is a raised pattern. By contrast, the following is also possible: each of the elements 3 of the pattern 4 formed on the surface of the optical panel 2 is a convexity and hence the molding pattern 15 formed on the surface of the die 10 for molding the optical panel 2 is a depressed pattern. The latter case is shown in FIG. 4 and FIG. 5 as schematic vertical cross-sectional views corresponding to those exhibited as FIG. 2 and FIG. 3, respectively. In the case shown in FIG. 4, an optical pattern 4 is formed by forming pattern elements 3 as convexities on one side of surfaces of an optical panel 2. FIG. 5 shows a die for molding an optical panel having the pattern shown in FIG. 4 and integrally formed on the optical panel, the die comprising a metal substrate 11 and a molding pattern 15 which corresponds to the raised-pattern elements 3 shown in FIG. 4 and is formed of a photosensitive heat-resistant resin as a depressed pattern on one side of surfaces of the metal substrate 11, wherein the whole of the surface having the molding pattern 15 of the metal substrate 11 is covered with a layer 12 of the aforesaid heat-resistant resin.

The thickness of the thin portions (where the concaves of the pattern are formed) of the heat-resistant resin layer 12 covering the whole of the one side of surfaces of the metal substrate 11 may be in a range of about 10 μm or less, preferably 0.1 to 5 μm. On the other hand, the thickness (the height from the surface of the metal substrate 11) of the thick portions (where the convexities of the pattern are formed) of the heat-resistant resin layer 12 may be in a range of about 30 μm or less, preferably 5 to 15 μm. The difference in thickness between the thin portions (where the concaves of the pattern are formed) and the thick portions (where the convexities of the pattern are formed) may be in a range of about 25 μm or less, preferably 1 to 15 μm.

As the metal substrate 11, any metal substrate may be used so long as it can be used as a die for molding a thermoplastic resin or the like. A material for the metal substrate 11 is not particularly limited, and, for example, a stainless-steel plate, copper plate, brass plate, nickel plate or the like is suitably used as the material. The thickness of the metal substrate 11 is also not particularly limited, and is preferably 0.1 to 5 mm from the viewpoint of ease of handling, etc.

The molding pattern 15 shown in each of FIG. 3 and FIG. 5 is formed by a photoresist method using a photosensitive heat-resistant resin, according to the present invention. In this case, the surface of the metal substrate 11 on which the layer 12 of the aforesaid photosensitive heat-resistant resin is to be formed is preferably rough for improving the durability of the resulting die in injection molding of a molten resin by the use of the die. As this surface, advantageous is a rough surface obtained by roughening a surface prepared in a substantially specular state, by a method generally known as a surface-roughening method, such as shot blast treatment or hairline treatment. The degree of the surface roughening is not particularly limited, and, for example, the centerline average roughness Ra ranges preferably from 0.1 to 1 μm as measured according to JIS B 0601.

When uniform illumination on one surface is carried out by guiding light from the edge of a light-guiding plate such as the light-guiding plate of a backlight for a liquid crystal display, a subtle light-and-darkness pattern tends to be formed at each end of one side of the edge face on the light-guiding edge side. It is very difficult to design an optical pattern by taking the above fact into consideration for correction for the light-and-darkness pattern. Therefore, in a conventional mold comprising a nickel stamper, the roughness is varied for correction for the light-and-darkness pattern by subjecting a suitable portion at each end of one side of the edge face on the light-guiding edge side to after-treatment such as blasting. When the surface of the metal substrate 11 is roughened in the optical-panel molding die of the present invention, the whole surface is uniformly roughened in principle. However, when the same correction as described above is necessary at each end of one side of the edge face on the light-guiding edge side, it is effective to previously vary the roughness of suitable portions of the surface of the metal substrate 11 which correspond to the ends, respectively, of one side of the edge face on the light-guiding edge side.

In the present invention, the molding pattern 15 is formed on the metal substrate 11 by a photoresist method using a photosensitive heat-resistant resin. The term "photoresist method" used herein means a method adopted for patterning by the use of a photoresist in the field of semiconductors or a method similar thereto, in which a photoresist film is formed on a metal substrate, is exposed to light through a mask having a pattern formed thereon, and is then developed to transfer the pattern of the mask used for the exposure to the metal surface.

The photosensitive heat-resistant resin used herein is a resin which is used, for example, in the field of semiconductors, in particular, in a protective coating film for semiconductor wafer, an interlaminar insulating film and the like, and has a high resolution on exposure and development and a high adhesion on baking. The term "heat-resistant" used herein means that, for example, a pattern formed of the heat resistant-resin is not deformed in a short time even when heated at a molding temperature (for instance, about 300° C.) employed for molding a resin which constitutes an optical panel, by the use of a die having the pattern. Because of the high resolution of such a photosensitive heat-resistant resin, employment of the resin makes it possible to form a molding pattern corresponding to a fine, precise and high-density optical pattern, certainly as a fine raised or depressed pattern directly on one side of surfaces of the metal substrate 11 by the photoresist method. The employment of the resin facilitates and ensures molding of an optical panel, prevents partial peeling of the molding pattern from the surface of the metal substrate 11 as much as possible owing to the high adhesion of the resin, and assures the durability of the molding die suitable for the mass production of the optical panel.

Photosensitive resins include positive-working photosensitive resins and negative-working photosensitive resins. Any of them may be used in the present invention so long as it is a heat-resistant resin. The positive-working photosensitive resins are slightly or not soluble in a developing solution in themselves, but they are chemically changed by exposure to light so that a portion composed of the resin exposed becomes soluble in the developing solution, while a portion composed of the resin not exposed remains as an image after development. On the other hand, the negative-working photosensitive resins are soluble in a developing solution in themselves, but they are chemically changed by exposure to light to be cured so that a portion composed of the resin exposed becomes slightly or not soluble in the developing solution and remains as an image after development.

Typical examples of the photosensitive heat-resistant resin are photosensitive polyimide resins. The photosensitive polyimide resins include resins obtained by mixing a non-photosensitive polyimide with a photoreactive low-molecular weight compound to make the same photosensitive (mixture type) and resins obtained by modifying some of the carboxyl groups or hydroxyl groups of a polyimide having the carboxyl groups or hydroxyl groups (modification type). The photosensitive polyimide resins of either type may be used in the present invention. The former, i.e., the mixture type photosensitive polyimide resin acts as a positive-working resin when the photoreactive low-molecular weight compound in the resin is a compound obtained by modifying some of its groups soluble in an alkali developing solution, such as carboxyl groups or hydroxyl groups, the modified groups being cleaved by exposure to light so that a portion composed of the compound exposed is soluble in the developing solution. The mixture type photosensitive polyimide resin acts as a negative-working resin when a photopolymerizable compound is used as the photoreactive low-molecular weight compound. The latter, i.e., the modification type photosensitive polyimide resin acts as a positive-working resin when the groups provided by modifying some of the carboxyl groups or hydroxyl groups are cleavable by exposure to light. The modification type photosensitive polyimide resin acts as a negative-working resin when the modifying group is photopolymerizable. There is a review on the photosensitive polyimide resins, for example, in Fukushima et al. "Kohbunshi Kakoh" Vol. 50, No. 12, pp. 553–560 (2001) (Kohbunshi Kankohkai).

Commercially available positive-working photosensitive polyimide resins include, for example, resins among semiconductor coating materials "Sumiresin Excel CRC-8000" series manufactured by Sumitomo Bakelite Company Limited. A specific example thereof is CRC-8300 and this resin can be used in the present invention. Commercially available negative-working photosensitive polyimide resins include, for example, "PI-2732" manufactured by Hitachi Chemical DuPont MicroSystems Ltd.

By the photoresist method using a photosensitive heat-resistant resin, the molding pattern 15 can, of course, be formed as lines. Furthermore the molding pattern 15 can be formed also as dots such as circular dots, rectangular dots or the like, and in either the raised pattern shown in FIG. 3 or the depressed pattern shown in FIG. 5, the diameter or the length of one side of each pattern element can be properly varied in a range of 1 to 300 μm, and the distance between adjacent pattern elements can be properly varied in a range of 5 μm to 1 mm. The size of the pattern elements and/or the distance between adjacent pattern elements can be varied properly and gradually in the above ranges from value(s) of the size and/or the distance at one end of an optical panel to those at the other end.

In the wedge-shaped light-guiding plate with a light source located beside the edge of the plate which is shown in FIG. 1, it is preferred that a very fine pattern element is formed on the light source side, a rather large pattern element is formed on the other side, and the size (the diameter or the length of one side) of pattern elements is varied gradually and continuously between the pattern element on the light source side and the pattern element on the other side, whereby uniform emitted light having a high luminance can be sent to the liquid crystal 9. When a light-guiding plate composed of a flat plate is used and a light source is located beside each of the two edges of the light-guiding plate, a very fine pattern element is formed in each end portion near the light source, a rather large pattern element is formed in the middle portion far from the light sources, and the size (the diameter or the length of one side) of pattern elements is varied gradually and continuously between the pattern element in the end portion and the pattern element in the middle portion, whereby uniform emitted light having a high luminance can be sent to the liquid crystal 9. Also in the case of an optical pattern in which the size of pattern elements is thus continuously varied in a plane, the molding pattern 15 of the molding die 10 can be formed according to the present invention so that the optical pattern can be formed with high dimensional accuracy.

The molding pattern can be formed on the metal substrate 11 by the use of a photosensitive heat-resistant resin through, for example, a coating step in which the photosensitive heat-resistant resin is applied on the metal substrate 11 to form a photoresist film on the surface; a pre-baking step in which the photoresist film is preheated to be lightly densified; a light exposure step in which the aforesaid resin applied, i.e., the photosensitive heat-resistant resin layer 12 (the photoresist film) is exposed to light through a mask having a pattern corresponding to an optical pattern; a development step in which the photosensitive heat-resistant resin layer 12 exposed is developed; a rinsing step in which the portions removed by the development are rinsed away; and a baking step in which the pattern formed by the development is baked at a high temperature to cure the photosensitive heat-resistant resin and form a raised or depressed pattern 15. As these steps, steps employed in the case of using a positive-working photosensitive heat-resistant resin are fundamentally the same as steps employed in the case of using a negative-working photosensitive heat-resistant resin. The image formed by the former steps and the image formed by the latter steps are merely reverse to each other. Therefore, it is sufficient that the profile of pattern of the mask used in the light exposure step is chosen depending on the type of the photosensitive heat-resistant resin used and the profile of a desirable pattern.

In the present invention, as described above and as shown in FIG. 3 and FIG. 5, the molding die 10 is composed of the metal substrate 11 and the molding pattern 15 formed of a photosensitive heat-resistant resin on one side of surfaces of the metal substrate 11, and the whole of the surface having the molding pattern 15 formed thereon of the metal substrate 11 is covered with the layer 12 of the aforesaid heat resistant resin. Such a die 10 can be produced by forming a layer of the photosensitive heat-resistant resin on the surface of the metal substrate 11, exposing the photosensitive heat-resistant resin layer to light through a mask having a pattern corresponding to the optical pattern 4 of an optical panel 2, and developing the exposed resin layer to form the molding pattern 15 corresponding to the pattern formed on the mask, on the layer of the aforesaid photosensitive heat-resistant resin, while leaving the aforesaid photosensitive heat-resistant resin all over the one side of surfaces of the metal substrate also after the development.

Specifically, it is possible to adopt a method in which the development is terminated before the complete dissolution of portions to be developed of the photosensitive heat-resistant resin, whereby the photosensitive heat-resistant resin is left also on areas of the metal substrate which correspond to the developed portions of the resin. It is also possible to adopt a method in which two layers of the photosensitive heat-resistant resin are formed on the surface of the metal substrate and the first layer is deprived of its photosensitivity after its formation, whereby the first layer having no photosensitivity is left on the metal substrate. FIGS. 6A, 6B, 6C and 6D show the former method as schematic vertical cross-sectional views for individual steps. FIGS. 7A, 7B, 7C, 7D and 7E show the latter method as schematic vertical cross-sectional views for individual steps. The present inventive process for producing the optical-panel molding die is explained below with reference to these drawings.

Figure 6A:
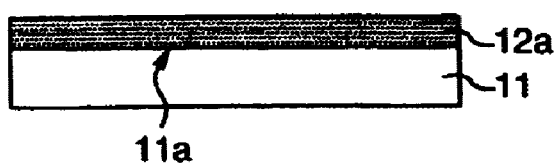
FIGS. 6A, 6B, 6C and 6D are schematic vertical cross-sectional views showing steps, respectively, for one mode for producing the molding die according to the present invention.
Figure 6B:
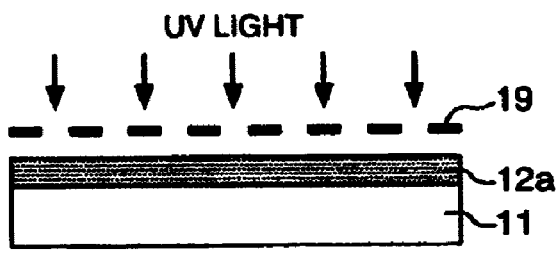
Figure 6C:
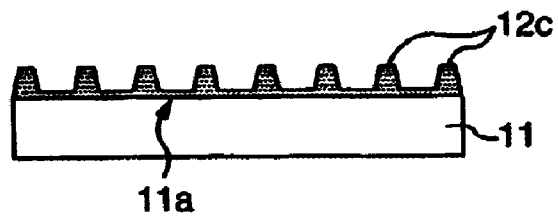
Figure 6D:
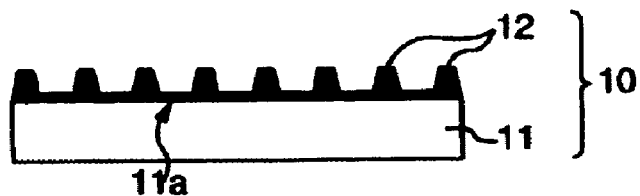

FIGS. 6A, 6B, 6C and 6D are schematic vertical cross-sectional views showing steps, respectively, for the production in the case where the above-mentioned first method is practiced, namely, the development is terminated before the complete dissolution of portions to be developed of the photo-sensitive heat-resistant resin, whereby the photosensitive heat-resistant resin is left also on areas of the metal substrate which correspond to the developed portions of the resin. These drawings show the case where a positive-working resin is used as the photosensitive heat-resistant resin. At first, as shown in FIG. 6A, the photosensitive heat-resistant resin is applied on the surface of the metal substrate 11 to form a photosensitive heat-resistant resin layer 12a. At least the surface 11a of the metal substrate 11 on which the photosensitive heat-resistant resin layer 12a is to be formed is preferably roughened as described above. Then, as shown in FIG. 6B, the aforesaid photosensitive heat-resistant resin layer 12a is exposed to ultraviolet light (UV light) through a mask 19 having a transmission and light-shielding pattern recorded thereon on the basis of a desirable optical pattern. Thereafter, as shown in FIG. 6C, the photosensitive heat-resistant resin layer 12a subjected to the above-mentioned exposure is developed with a developing solution, followed by rinsing.

In a conventional photoresist method using a positive-working photosensitive resin, the development is carried out in the development step until the surface of the metal substrate 11 are partly uncovered where the portions exposed to ultraviolet light of the resin layer are dissolved. On the other hand, in the above-mentioned first method employed in the present invention, the development is terminated before the portions exposed to ultraviolet light of the photosensitive heat-resistant resin layer 12a are completely dissolved by the development so that the whole of the surface 11a having a molding pattern of the metal substrate is covered with the above-mentioned heat-resistant resin. Thus, a concavities-and-convexities pattern 12c is formed of the photosensitive heat-resistant resin on the basis of the pattern formed on the mask 19, while the whole of the one surface 11a of the metal substrate 11 is covered with the aforesaid photosensitive heat-resistant resin.

Subsequently, the concavities-and-convexities pattern 12c formed on the one surface 11a of the metal substrate 11 is heated at a high temperature of 300° C. or higher to be cured and, at the same time, to be adhered and fixed to the metal substrate 11, whereby the cured concavities-and-convexities pattern 12 shown in FIG. 6E is obtained. By the process described above, an optical-panel molding die 10 can be obtained which is composed of the metal substrate 11 and the cured concavities-and-convexities pattern 12 formed on the one surface 11a of the metal substrate 11 on the basis of the pattern formed on the aforesaid mask 19.

Figure 7A:
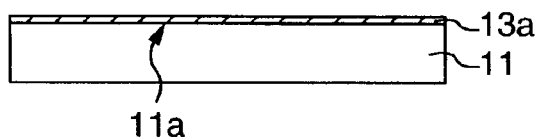
FIGS. 7A, 7B, 7C, 7D and 7E are schematic vertical cross-sectional views showing steps, respectively, for another mode for producing the molding die according to the present invention.

FIGS. 7A, 7B, 7C, 7D and 7E are schematic vertical cross-sectional views showing steps, respectively, for the production adopting the method in which two layers of the photosensitive heat-resistant resin are formed on the surface of the metal substrate, and the first layer is deprived of its photosensitivity after its formation, whereby the first layer having no photosensitivity is left on the metal substrate. These drawings also show the case where a positive-working resin is used as the photosensitive heat-resistant resin. At first, as shown in FIG. 7A, the photosensitive heat-resistant resin is applied on the surface of the metal substrate 11 to form a first photosensitive heat-resistant resin layer 13a. At least the surface 11a of the metal substrate 11 on which the photosensitive heat-resistant resin layer 13a is to be formed is preferably roughened as described above. In the case of the above method, a treatment for depriving the photosensitive heat-resistant resin of photosensitivity is then carried out. This inactivation treatment can be carried out, for example, by heating or by a method in which the whole surface of the first photosensitive heat-resistant resin layer 13a is irradiated with ultraviolet light used in a light exposure step carried out afterward. When the inactivation is carried out by heating, it is sufficient that the heating is conducted at a higher temperature for a longer time as compared with pre-baking treatment carried out afterward.

Figure 7B:
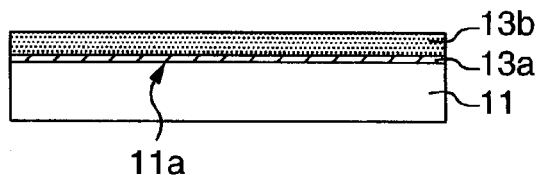
Figure 7C:
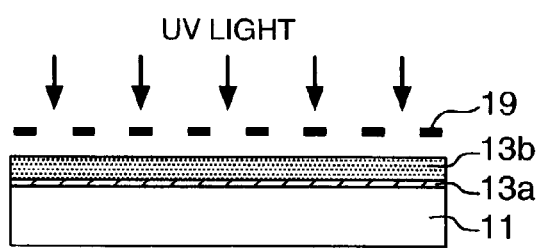
Figure 7D:
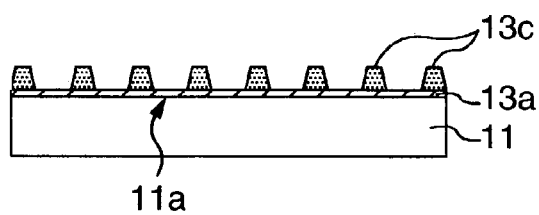

Thereafter, as shown in FIG. 7B, the same photosensitive heat-resistant resin is further applied on the heat-resistant resin layer 13a having no photosensitivity, to form a second photosensitive heat-resistant resin layer 13b. Then, the pre-baking treatment is carried out, after which as shown in FIG. 7C, the second photosensitive heat-resistant resin layer 13b is exposed to ultraviolet light (UV light) through a mask 19 having a transmission and light-shielding pattern recorded thereon on the basis of a desirable optical pattern. After the exposure to ultraviolet light, the second photosensitive heat-resistant resin layer 13b subjected to the light exposure is developed with a developing solution and is rinsed as shown in FIG. 7D, whereby a concavities-and-convexities pattern 13c is formed on the second photosensitive heat-resistant resin layer 13b on the basis of the pattern formed on the mask 19, while the whole of the one surface 11a of the metal substrate 11 is covered with the first photosensitive heat-resistant resin layer 13a (which has already been deprived of photosensitivity).

Figure 7E:
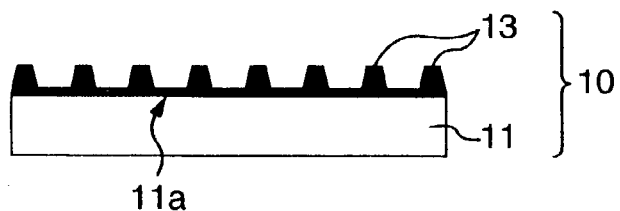

Subsequently, the first layer 13a, which is formed of the photosensitive heat-resistant resin on the one surface 11a of the metal substrate 11, and the concavities-and-convexities pattern 13c are heated at a high temperature of 300° C. or higher to be cured and, at the same time, are adhered and fixed to the metal substrate 11, whereby the cured concavities-and-convexities pattern 13 shown in FIG. 7E is obtained. By the process described above, an optical-panel molding die 10 can be obtained which is composed of the metal substrate 11 and the cured concavities-and-convexities pattern 13 formed on the one surface 11a of the metal substrate 11 on the basis of the pattern formed on the aforesaid mask 19.

The steps shown in FIGS. 6A, 6B, 6C and 6D and FIGS. 7A, 7B, 7C, 7D and 7E are explained below in further detail. The coating step is carried out, for example, as follows. The photosensitive heat-resistant resin is supplied to the surface 11a (i.e. the surface on which a coating film is to be formed) of the metal substrate 11 set in a spin coater, by dropping, spraying or the like, and then the metal substrate 11 is rotated at high speed to form a layer of the photosensitive heat-resistant resin in a proper thickness. Specifically, the photosensitive heat-resistant resin may be applied to have a uniform thickness of about 30 μm or less, and is preferably not more than 20 μm and not less than 5 μm, depending on the proper depth or height of the optical pattern of a desirable optical panel, to form the photosensitive heat-resistant resin layer 12a or the photosensitive heat-resistant resin layers 13a and 13b. When two layers of the photosensitive heat-resistant resin are formed as in FIGS. 7A and 7B, the thickness of the photosensitive heat-resistant resin layer referred to here is the total thickness of the two layers.

When two layers of the photosensitive heat-resistant resin are formed as in FIGS. 7A and 7B and, in particular, the surface 11a of the metal substrate 11 on which the layers are to be formed is roughened, the thickness of the first photosensitive heat-resistant resin layer 13a is preferably adjusted to 5 μm or less, and is more preferably from 0.1 to 5 μm, and the total thickness of the first photosensitive heat-resistant resin layer 13a and the second photosensitive heat-resistant resin layer 13b is preferably adjusted to about 30 μm or less, and is more preferably from 5 to 25 μm. When the first photosensitive heat-resistant resin layer 13a formed at first by coating on the one surface 11a of the metal substrate 11 is thus a thin film of 0.1 to 5 μm so that the surface of the photosensitive heat-resistant resin layer 13a may reflect the degree of roughness of the metal substrate 11 surface, an optical panel produced by setting the resulting molding die on a cavity surface and, for example, injection-molding a molten resin by the use of the die has an optical pattern whose convex portions have a rough surface. When this optical panel is used as, for example, the light-guiding plate of a backlight for a liquid crystal display, the durability of the reflective sheet of the backlight and the optical panel itself is further improved by the effect of, for example, the reduction of the contact area with the reflective sheet.

In the pre-baking step, by the use of a heating oven, the above-mentioned photosensitive heat-resistant resin layer 12a or 13b is placed, for example, in an atmosphere heated at about 120° C. to be lightly densified. The pre-baking step makes it possible to carry out precise and high-density exposure certainly in the subsequent light exposure step.

The light exposure step can be carried out, for example, by a method in which the above-mentioned photosensitive heat-resistant resin layer 12a or 13b is irradiated with g-line light, i-line light or continuous-wavelength light comprising them, by means of a stepper (a light exposure machine) through the mask 19 having a pattern corresponding to the optical pattern. As a light source capable of emitting continuous-wavelength light comprising ultraviolet light, a high-pressure mercury lamp, for example, can be used. In the cases shown in the drawings, the mask 19 masks areas corresponding to the convex portions of a molding pattern and permits irradiation of the non-masked areas with light from the light source, i.e., light exposure of these areas.

The development step is carried out, for example, as follows. The metal substrate 11 having the photosensitive heat-resistant resin layer 12a or 13b subjected to the above-mentioned light exposure is set in a developer (a developing machine), and a developing solution for resist, an aqueous alkali solution, is supplied to the metal substrate 11 by dropping, spraying or the like, while rotating or stopping the metal substrate 11. Thus, the developing solution is uniformly distributed to permeate and dissolve the light-exposed non-masked portions other than the above-mentioned fine convex portions. The development can be carried out also by immersing the metal substrate 11 having the photosensitive heat-resistant resin layer 12a or 13b subjected to the light exposure, in a developing solution for resist, an aqueous alkali solution, for a predetermined time.

The rinsing step is carried out, for example, by supplying pure water to the metal substrate 11 subjected to the above-mentioned development, by dropping, spraying or the like, while rotating the metal substrate 11 at high speed, to rinse away the dissolved portions described above. The metal substrate 11 subjected to the development can be rinsed also by dipping or properly shaking the metal substrate 11 in running water.

In the subsequent baking step, by the use of a heating oven, the metal substrate 11 with the concavities-and-convexities pattern 12c or 13c with 13a obtained after the above-mentioned rinsing is placed in an atmosphere heated at approximately 300 to 400° C. to cure the pattern formed by the development and to adhere and fix the pattern to the metal substrate 11, whereby a molding pattern corresponding to the optical pattern is formed.

By the above procedure, the molding pattern (the cured concavities-and-convexities pattern) 12 or 13 reverse to the optical pattern of the optical panel is formed directly on the metal substrate 11, and the high adhesion of the cured concavities-and-convexities pattern 12 or 13 to the metal substrate 11 is assured, whereby the molding die 10 suitable for molding the optical panel can be obtained.

The molding die 10 thus obtained is suitably used for producing an optical panel having an optical pattern integrally formed on at least one side of surfaces of the optical panel, by setting the molding die 10 on at least one of the two surfaces of a mold and injection-molding a transparent molten thermoplastic resin by the use of the mold. Specifically, the die 10 is set on the mold surface(s) constituting the cavity of an injection molding machine, and the injection molding is carried out at a molding temperature suitable for the thermoplastic resin used. Thus, a concavities-and-convexities pattern corresponding to the cured concavities-and-convexities pattern 12 or 13 formed on the molding die 10 is transferred to the surface of the thermoplastic resin. When the molding die 10 of the present invention is used, a very precise, high-density and fine pattern can be transferred with high accuracy. The molding die 10 can be set on the mold surface(s), for example, by fixation by means of bolts, adhesion, or suction from the mold surface side.

In this case, when the injection molding is carried out by setting the molding die 10 of the present invention on each of the two mold surfaces, an optical panel can be obtained which has a pattern capable of reflecting guided light on one side and a diffusing pattern on the other side. In this case, the patterns themselves of the dies set on the mold surfaces, respectively, are usually different from each other.

An optical panel can be produced also by using the molding die 10 of the present invention in any of well-known various molding methods such as press molding of a thermoplastic resin. Whatever molding method may be adopted, thermoplastic transparent synthetic resins having a high light transmittance, such as methacrylate resins, polycarbonate resins, amorphous cyclic polyolefin resins, methyl methacrylate/styrene copolymer (MS) resins, polystyrene resins and the like are suitably used as a thermoplastic resin which constitutes the optical panel.

Moreover, the molding die of the present invention can be used also in so-called 2P (photopolymer) molding using an ultraviolet-curable resin. When an optical panel is produced by 2P molding, an ultraviolet-curable resin is applied on the surface having the cured concavities-and-convexities pattern 12 or 13 formed thereon of the die 10, and a transparent substrate is pushed against the resin, after which the ultraviolet-curable resin is irradiated with ultraviolet light from the transparent substrate side to be cured, and the resulting optical panel made of the cured resin is taken out.

An explanation is given above with priority given to the case where the present invention is applied to the production of a light-guiding plate as an edge light panel used in a backlight for a liquid crystal display, though the present invention can be similarly applied also to the production of an optical panel having an optical pattern (e.g. dots or lines) integrally formed on at least one side of surfaces of the optical panel, which is, for example, an edge light panel or a light-diffusing panel, which is used in a front light for a liquid crystal display, and various illuminators such as electric signs. Furthermore, in conducting the present invention, the practical materials, the shapes, the structures, the production or manufacture processes, the steps in the processes, the densities, the sizes, the locations, the uses, and modifications to them of/for the molding die, its molding pattern, the optical panel, its optical patterns (e.g. a pattern capable of reflecting guided light and a light-diffusing pattern), the optical elements, the reflecting means, the diffusing means, and photosensitive heat-resistant resins can be varied in many ways. Such variations are to be regarded as within the scope and the spirit of the invention described above.

DESCRIPTION OF PREFERRED EMBODIMENTS

The present invention is illustrated in further detail with the following examples, which should not be construed as limiting the scope of the invention. At first, there is described the case where a layer of a photosensitive heat-resistant resin was formed all over one side of a metal substrate by stopping development halfway, according to the steps shown in FIGS. 6A, 6B, 6C and 6D.

EXAMPLE 1

Figure 8:
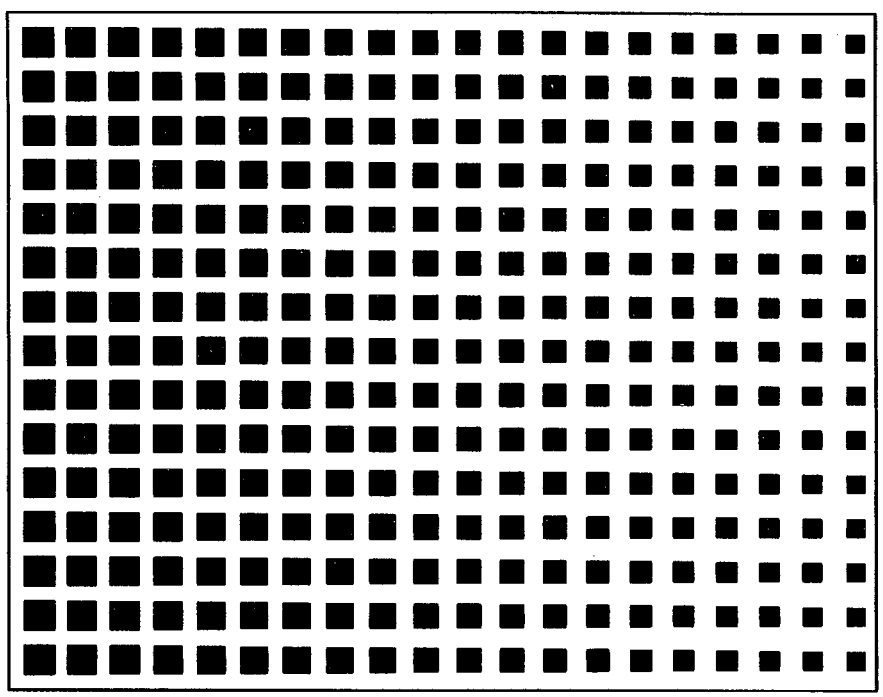
FIG. 8 is a schematic plan view for explaining the pattern of the filmy mask used in Example 1.

A 343 mm×264 mm×0.3 mm (thickness) stainless-steel plate was used as a metal substrate for forming a pattern of a photosensitive heat-resistant resin on one side of surfaces of the metal substrate. The centerline average roughness Ra of the stainless-steel plate was 0.05 μm as measured according to JIS B 0601. On the other hand, as the photosensitive heat-resistant resin, "Sumiresin Excel CRC-8300S", a positive-working photosensitive polyimide resin solution manufactured by Sumitomo Bakelite Company Limited was applied on the surface of the aforesaid stainless-steel plate with a spin coater so that the thickness of the coating film after pre-baking might be about 12 μm. The stainless-steel plate was air-dried and then was held in an oven at 125° C. for 5 minutes to be subjected to pre-baking. The resulting photosensitive resin layer was exposed to light for 90 to 100 seconds with an exposing machine "MC Printer" manufactured by Mesh Industrial Co., Ltd. and capable of emitting continuous-wavelength light comprising g-line light, i-line light and the like remarkably, through a filmy mask having a light-shielding and light-exposure pattern formed thereon on a CAD design. The filmy mask used here was as follows: as shown in FIG. 8 as a schematic plan view, the mask had a light-shielding pattern formed as angle-rounded-off squares, the size of the squares had been varied gradually and continuously from a value at one edge (the short side) of the stainless-steel plate as substrate to a value at the other edge (the other short side), the length of side of the smallest square was about 60 μm, the length of side of the largest square was about 100 μm, and the distance (pitch) between adjacent pattern elements was about 170 μm throughout the surface. It is to be understood that FIG. 8 is for explaining the arrangement of the pattern elements and does not reflect the actual dimensional ratios.

The stainless-steel substrate with the photosensitive resin layer subjected to the light exposure was immersed in a stainless-steel square-shaped vessel containing about 2 liters of an alkaline developing solution "SOPD" manufactured by Sumitomo Chemical Co., Ltd., to be brought into contact with the developing solution for about 40 seconds. Then, the substrate was quickly taken out of the developing solution and was rinsed with pure water running into another vessel. The rinsed substrate was placed in an oven, was heated to 150° C. under nitrogen over a period of about 30 minutes, was maintained at 150° C. for 30 minutes, was heated to 360° C. over a period of about 30 minutes, and then was maintained at 360° C. for 30 minutes to be subjected to baking. A section of the resulting pattern was observed under a microscope to find that the thickness of the resin layer in the exposed areas (the areas where the resin had been dissolved away by the development) was about 2 μm, and that a raised pattern composed of angle-rounded-off squares had been formed.

The thus obtained molding die with the pattern was attached to one surface (cavity side part) of an injection mold, and a methacrylate resin was injection-molded by the use of the injection mold to produce a light-guiding plate having a depressed pattern integrally formed on one side of surfaces of the plate. This injection molding involves a step of taking out the molded product by opening the mold. In this step, unless the molded product is adhering to the force side part of the injection mold, a subsequent step cannot be carried out, so that the molding operation is undesirably interrupted. In the present example, since the molding die with the pattern was attached to the cavity side part, the resistance on the surface of the molded product at the time of its release from the mold was stronger on the side which was in contact with the cavity side part. Therefore, when the mold was opened, the molded product was liable to adhere to the cavity side part, so that continuous molding was apt to be impossible. For avoiding this trouble, there are various methods such as a method of improving the mold release properties by adding a lubricant to the resin used or applying a mold release agent on the mold. It is also an effective method to lower the temperature of the charged resin (the molded product) in the mold sufficiently to the mold temperature by lengthening the cooling time. Therefore, the mold release properties of the molding die produced were evaluated herein by the cooling time required for the molded product to follow the force side part stably. As a result, it was found that a necessary and minimum cooling time in the present example was 40 seconds.

EXAMPLE 2

The same stainless-steel plate as in Example 1 was subjected to shot blasting using glass beads, to be given a centerline average roughness Ra of 0.35 μm. Except for using the stainless-steel plate having the thus roughened surface, as a substrate, the process of Example 1 was repeated to produce a molding die having an average resin layer thickness in the exposed areas (the areas where the resin had been dissolved away by the development) of about 2 μm and having a raised pattern composed of angle-rounded-off squares. Using this molding die, a methacrylate resin was injection-molded by the same method as in Example 1, and the mold release properties were evaluated. As a result, it was found that a necessary and minimum cooling time in the present example was 38 seconds.

Next, there is described below the case where according to the steps shown in FIGS. 7A, 7B, 7C, 7D and 7E, two layers of a photosensitive heat-resistant resin were formed on a metal substrate and the first layer was deprived of its photosensitivity after its formation, whereby the first layer having no photosensitivity was left on the metal substrate.

EXAMPLE 3

"Sumiresin Excel CRC-8300S", the same positive-working photosensitive polyimide resin solution as used in Example 1 was applied on the surface of the same stainless-steel plate as used in Example 1, with a spin coater so that the thickness of the coating film after inactivation by heating might be about 5 μm. The stainless-steel plate was air-dried and then was held in an oven at 150° C. for about 30 minutes to deprive the polyimide resin coating film of its photosensitivity. On this coating film, the same positive-working photosensitive polyimide resin solution as used in the first coating operation was applied with a spin coater so that the thickness of the second layer after pre-baking might be about 12 μm. The stainless-steel plate thus treated was air-dried and then held in an oven at 125° C. for about 5 minutes to be subjected to pre-baking. The resulting photosensitive resin layer was exposed to light for 90 to 100 seconds with the same exposing machine as in Example 1 through a filmy mask having a light-shielding and light-exposure pattern formed thereon on a CAD design. In this case, the light-shielding and light-exposure pattern of the filmy mask used was reverse to that of the filmy mask used in Example 1.

The stainless-steel substrate with the photosensitive resin layer subjected to the light exposure was brought into contact with the same alkaline developing solution as used in Example 1, for about 100 seconds by the same development operation as described in Example 1. Then, the substrate was quickly taken out of the developing solution and was rinsed with pure water running into another vessel. The rinsed substrate was subjected to baking treatment under the same conditions as employed in Examples 1 and 2. A section of the resulting pattern was observed under a microscope to find that the thickness of the resin layer in the exposed areas (the areas where the resin had been dissolved away by the development) was about 5 µm, and that a depressed pattern composed of angle-rounded-off squares had been formed.

Using the molding die thus obtained, a methacrylate resin was injection-molded by the same method as in Example 1, and the mold release properties were evaluated. As a result, it was found that a necessary and minimum cooling time in the present example was 45 seconds.

EXAMPLE 4

The same stainless-steel plate as in Example 3 was subjected to shot blasting using glass beads, to be given a centerline average roughness Ra of 0.35 µm. Except for using the stainless-steel plate having the thus roughened surface, as a substrate and changing the thickness of the first photosensitive polyimide resin layer after the inactivation by heating to about 3 µm, the process of Example 3 was repeated to produce a molding die having an average resin layer thickness in the exposed areas (the areas where the resin had been dissolved away by the development) of about 3 µm and having a depressed pattern composed of angle-rounded-off squares. Using this molding die, a methacrylate resin was injection-molded by the same method as in Example 1, and the mold release properties were evaluated. As a result, it was found that a necessary and minimum cooling time in the present example was 43 seconds.

COMPARATIVE EXAMPLE 1

The process of Example 1 was repeated except for changing the time of the development with the alkaline developing solution to about 100 seconds, to produce a molding die with a pattern in which the light-exposed portions had been completely removed by the development to expose the surface of the stainless-steel substrate and a raised pattern composed of angle-rounded-off squares had been formed on the exposed substrate surface. Using this molding die, a methacrylate resin was injection-molded by the same method as in Example 1, and the mold release properties were evaluated. As a result, it was found that a necessary and minimum cooling time in the present comparative example was 60 seconds.

As described above, when there was used the molding die of the Example 1 or 3 having the heat-resistant resin layer left also in the concave portions of the concavities-and-convexities pattern formed of the photosensitive heat-resistant resin, the mold release properties in injection molding were higher than that attained when there was used the molding die of Comparative Example 1 in which the stainless-steel substrate had been exposed in the concave portions. When there was used the molding die of Example 2 having the same pattern as in Example 1 on the roughened surface of the stainless-steel substrate, the mold release properties were still higher than that attained in Example 1. Similarly, when there was used the molding die of Example 4 having the same pattern as in Example 3 on the roughened surface of the stainless-steel substrate, the mold release properties were still higher than that attained in Example 3. Therefore, it is conjectured that when the molding dies of Examples 1 to 4 are used, their durability was also good.

According to the present invention, in forming a molding pattern directly on a metal substrate by a photoresist method using a photosensitive heat-resistant resin, the whole of the surface having the molding pattern formed thereon of the metal substrate is covered with a layer of the heat-resistant resin, whereby in molding of an optical panel by the use of the thus obtained molding die, the mold release properties can be improved and the durability of the die can be enhanced. In this case, when the surface of the metal substrate which is to be covered with the heat-resistant resin is roughened, the durability of the die obtained can be further enhanced. This die can easily be produced and makes it possible to produce many kinds of optical panels in a small number certainly in a short time before the appointed date of delivery. When such a molding die is used, even an optical panel having a precise and high-density pattern can be produced easily and certainly with high accuracy.

What is claimed is:

1. A process for producing an optical-panel molding die for integrally forming an optical pattern on at least one side of surfaces of an optical panel, the process comprising forming a layer of a photosensitive heat-resistant resin on a surface of a metal substrate, exposing the layer of the photosensitive heat-resistant resin to light through a mask having a pattern corresponding to the optical pattern of the optical panel, and developing the exposed layer to form a molding pattern corresponding to the pattern of the mask on the layer of the photosensitive heat-resistant resin, wherein the photosensitive heat-resistant resin is left all over the one side of surfaces of the metal substrate after developing, wherein said developing is terminated before complete dissolution of portions to be developed of the photosensitive heat-resistant resin, whereby the photosensitive heat-resistant resin is left also on areas of the metal substrate which correspond to the developed portions of the resin.

2. A process according to claim 1, wherein the surface of the metal substrate is roughened by shot blast treatment or hairline treatment and then the layer of the photosensitive heat-resistant resin is formed on the roughened surface.

3. A process for producing an optical-panel molding die for integrally forming an optical pattern on at least one side of surfaces of an optical panel, the process comprising forming a first layer of a photosensitive heat-resistant resin on a surface of a metal substrate, desensitizing the first layer after its formation on the substrate, forming a second layer of the photosensitive heat-resistant resin on the desensitized first layer, exposing the second layer of the photosensitive heat-resistant resin to light through a mask having a pattern corresponding to the optical pattern of the optical panel, and developing the layers to form a molding pattern corresponding to the pattern of the mask on the layer of the photosensitive heat-resistant resin, wherein the photosensitive heat-resistant resin is left all over the one side of surfaces of the metal substrate after developing.

4. A process according to claim 3, wherein the surface of the metal substrate is roughened by shot blast treatment or hairline treatment and then the first layer of the photosensitive heat-resistant resin is formed on the roughened surface.

5. A process according to claim 3, wherein the surface of the metal substrate is roughened and the first layer of the photosensitive heat-resistant resin is formed in a thickness of 0.1 to 5 μm on the roughened surface.

* * * * *

UNITED STATES PATENT AND TRADEMARK OFFICE
CERTIFICATE OF CORRECTION

PATENT NO. : 7,094,520 B2 Page 1 of 1
APPLICATION NO. : 10/389939
DATED : August 22, 2006
INVENTOR(S) : Murata et al.

It is certified that error appears in the above-identified patent and that said Letters Patent is hereby corrected as shown below:

Title Page, Item (*) Notice: Delete "0 days" and insert --32 days--.

Signed and Sealed this

Seventh Day of August, 2007

JON W. DUDAS
*Director of the United States Patent and Trademark Office*